(12) United States Patent
Väänänen et al.

(10) Patent No.: US 8,005,068 B2
(45) Date of Patent: Aug. 23, 2011

(54) METHOD OF SETTING UP A CONNECTION FOR CALLS

(75) Inventors: Kai Väänänen, Espoo (FI); Sami Ala-Luukko, Helsinki (FI)

(73) Assignee: Sonera Oyj, Helsinki (FI)

( * ) Notice: Subject to any disclaimer, the term of this patent is extended or adjusted under 35 U.S.C. 154(b) by 1954 days.

(21) Appl. No.: 10/398,069

(22) PCT Filed: Oct. 2, 2001

(86) PCT No.: PCT/FI01/00858
§ 371 (c)(1),
(2), (4) Date: Jul. 11, 2003

(87) PCT Pub. No.: WO02/30139
PCT Pub. Date: Apr. 11, 2002

(65) Prior Publication Data
US 2004/0013109 A1     Jan. 22, 2004

(30) Foreign Application Priority Data
Oct. 3, 2000     (FI) ...................................... 20002182

(51) Int. Cl.
    *H04L 12/66*     (2006.01)
(52) U.S. Cl. ........................................ 370/352; 370/401
(58) Field of Classification Search .................. 370/352, 370/356, 395.52, 401, 211.02, 398, 389
    See application file for complete search history.

(56) References Cited

U.S. PATENT DOCUMENTS

| | | | | |
|---|---|---|---|---|
| 6,031,836 A | * | 2/2000 | Haserodt | 370/389 |
| 6,115,754 A | * | 9/2000 | Landgren | 709/249 |
| 6,216,000 B1 | * | 4/2001 | Blumhardt | 455/435.2 |
| 6,275,490 B1 | * | 8/2001 | Mattaway et al. | 370/352 |
| 6,320,857 B1 | * | 11/2001 | Tonnby et al. | 370/352 |
| 6,339,592 B2 | * | 1/2002 | Fugino et al. | 370/352 |

(Continued)

FOREIGN PATENT DOCUMENTS
EP     0 889 627 A2     1/1999
(Continued)

OTHER PUBLICATIONS

Prototyping SIP-based VoIP services in Java Hua Zou; Hongman Wang; Wenxin Mao; Bai Wang; Focant, S.; Handekyn, K.; Chantrain, D.; Marly, N.; Communication Technology Proceedings, 2000. WCC-ICCT 2000. International Conference on vol. 2, Aug. 21-25, 2000 pp. 1395-1399 vol. 2.*

(Continued)

*Primary Examiner* — Ricky Ngo
*Assistant Examiner* — Gary Mui
(74) *Attorney, Agent, or Firm* — Cozen O'Connor

(57) ABSTRACT

The invention relates to a telecommunications system comprising at least a terminal (11) from which a connection can be set up to the Internet (12); and an exchange (14) for routing calls on the basis of information in a register (16). The system further comprises an Internet server (13) comprising means for controlling the installment of the software required in the terminal (11) for making and receiving VoIP calls and the activation of the application required for making and receiving VoIP calls as a response to the request transmitted from the terminal (11); means for changing call forwarding information in the register (16); means for converting the data flow transmitted from the exchange (14) to the terminal (11) into a mode suitable for the terminal (11).

9 Claims, 2 Drawing Sheets

U.S. PATENT DOCUMENTS

| | | | |
|---|---|---|---|
| 6,385,191 B1 * | 5/2002 | Coffman et al. | 370/352 |
| 6,563,814 B2 * | 5/2003 | Rowan et al. | 370/352 |
| 6,856,612 B1 * | 2/2005 | Bjelland et al. | 370/338 |
| 6,907,031 B1 * | 6/2005 | Ehlinger et al. | 370/352 |
| 6,990,094 B1 * | 1/2006 | O'Neal et al. | 370/352 |
| 6,996,090 B1 * | 2/2006 | De Loye | 370/352 |
| 2006/0034265 A1 * | 2/2006 | Thompson | 370/352 |
| 2006/0276179 A1 * | 12/2006 | Ghaffari et al. | 455/412.2 |

FOREIGN PATENT DOCUMENTS

| | | | |
|---|---|---|---|
| WO | WO 99/05590 | * | 2/1999 |
| WO | WO 00/14934 | | 3/2000 |

OTHER PUBLICATIONS

World Wide Web 3 (2000): "A web-based Internet Java Phone for real-time voice communication", Kia Ming Phua, Siu Cheung Hui, Chai Kiat Yeo, School of Computer Engineering, Nanyang Technological University, Singapore, julk. Syyskuu v. 2000, (luvut 1. Introduction 4. Internet Java Phone, 5.3. Downloading speed, 6. Conclusion.

* cited by examiner

METHOD OF SETTING UP A CONNECTION FOR CALLS

PRIORITY CLAIM

This is a U.S. national stage of application No. PCT/FI01/00858, filed on 2 Oct. 2001. Priority is claimed on that application and on the following application(s): Country: Finland, Application No.: 20002182, Filed: 3 Oct. 2000.

BACKGROUND OF THE INVENTION

The invention relates to call processing and particularly to making and answering calls by means of an IP (Internet Protocol) apparatus.

The VoIP (Voice of IP) technology refers to the transmission of voice communication in the form of data packets over an IP network. Previously known is a VoIP solution in which the user has separate VoIP terminal software in his personal computer, by means of which he can make and receive calls. In such a case, the software must be installed in the user's computer. Further, the user must configure certain network settings in his terminal, such as the gateways to be used, sub-networks and gatekeepers, before the software can be used. The VoIP program must be started every time the user wishes to make or receive calls.

A problem with the above-described solution is its complexity and the required installation and configuration measures. Furthermore, it is not user-friendly that separate software must be started every time when calls are processed.

BRIEF DESCRIPTION OF THE INVENTION

An object of the invention is thus to provide a method and an apparatus implementing the method in such a way that said problems can be solved. The object of the invention is achieved with a method and arrangement characterized in what is stated in the independent claims.

The object of the invention is to connect the VoIP technology to the present telephone system in a subscriber-specific manner. The invention is based on the idea that the user can make and receive calls with his own computer functioning as the VoIP terminal without any installing or configuration beforehand. An example of the utilization of the invention is a user who is travelling abroad and wishes to establish telephone communication. Thus, the user logs into the www (World Wide Web) server of the service provider by using any computer and receives automatically all calls addressed to him in his computer. Another example could be that the user is outside the area of the mobile network and wishes to listen to the messages left in the voice mail of the mobile station. In such a case, too, he can log into the www server in any computer having loudspeakers and a sound card and listen to the messages left in the voice mail. The solution is thus based on the idea that the user sets up a connection to the service provider's server and starts a telephone application. The required software is then automatically loaded to the user's terminal.

An advantage of the method and the system according to the invention is that it is user-friendly, because there is no need for carrying out software settings or device configuration measures, and no separate software needs to be started when calls are to be made or received.

In a first preferred embodiment of the telecommunications system according to the invention, the Internet server comprises means for converting a VoIP data flow into a streaming mode, and vice versa. The solution is based on combining the VoIP technology and the streaming technology in such a way that the user only sees the streaming part. Streaming refers to a technique of immediate video and audio information, in which sounds or images are transmitted over the Internet in almost real time. In other words, the file is not downloaded at first and replayed only after that, but the replaying begins as early as during the transmission. No video is used in this invention, but the technique has been designed for both data types. The VoIP signalling may be signalling according to the H.323-SIP (Session Initiating Protocol) or the MGCP (Media Gateway Control Protocol). The conversion from the VoIP mode into the streaming mode provides the advantage that the streaming technology typically requires less bandwidth for transferring sound than the VoIP technology. For the user this means higher quality of service.

In a second preferred embodiment of the telecommunications system according to the invention, the Internet server comprises means for controlling the installation of the software required for making and receiving VoIP calls and the activation of the application required for making and receiving VoIP calls as a response to a selection performed via a www page. Thus, the user sets up a connection in his terminal to the www page of the service provider and opens a streaming connection, whereby the service is activated. Thus, the server controls the loading of the required software to the terminal in such a way that the terminal can function as the client's telephone user interface.

Preferred embodiments of the invention are disclosed in the dependent claims.

BRIEF DESCRIPTION OF THE FIGURES

The invention will now be described in greater detail in connection with preferred embodiments, with reference to the attached drawings, of which

DETAILED DESCRIPTION OF THE INVENTION

Figure 1:
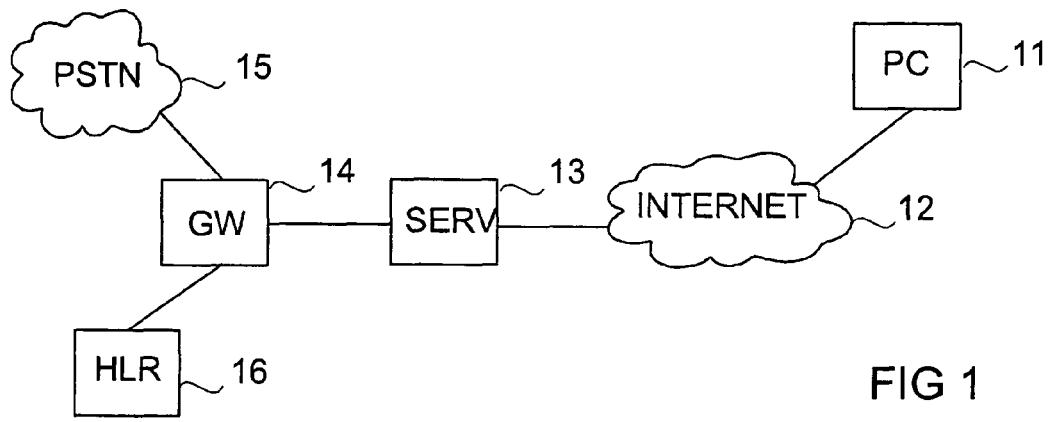
FIG. 1 shows a block diagram of a system according to the invention.

FIG. 1 shows a block diagram of a system according to the invention. The figure shows only the essential elements from the point of view of the understanding of the invention. The system comprises a VoIP terminal 11 in data transmission connection with the Internet 12, which can be for instance a PC computer; a server 13 controlled by the service provider, which performs conversions between different protocols; and a gateway exchange 14 connected to a public switched telephone network 15; and a home location register HLR in data transmission connection with gateway exchange 14. Gateway exchange 14 can also be connected to a GSM (Global System for Mobile Communication) mobile network. The server 13 consists of a VoIP part comprising the gatekeeper functions and operating in a way similar to a telephone exchange, and a streaming part comprising a streaming encoder and decoder.

Let us assume in a first example that the user wishes to activate the call service in his terminal 11. Thus, the user first sets up a connection via the Internet 12 to the service provider's www page and activates a call service from there by pressing a key. The server 13 opens then a streaming connection to the VoIP terminal 11 for calls. This can take place in such a way, for example, that a Java program is automatically loaded via a browser program, which Java program functions as the telephone user interface. In addition, information is transmitted from the server to the register 16 on the routing information to be changed.

In a second example, the user wishes to answer the call incoming from the public switched telephone network 15, for example. Thus, the incoming call is directed from the gateway exchange 14 to the server 13 on the basis of the information in the register 16. Signaling takes place in a VoIP-based manner, for instance in accordance with the H.323 protocol. The software in the server 13 converts the speech or data incoming from gateway exchange 14 into the streaming mode and transmits it further to the VoIP terminal 11. The streaming connection is maintained all the time between the VOIP terminal 11 and the server 13 at a low transmission rate, for example.

In a third example, the user wishes to make a call. Hence, the user starts the call in his VoIP terminal 11 by making a call by means of a program in the browser program. There is a streaming connection between the server 13 and the terminal 11. The server 13 converts the information in the streaming mode into the protocol-based VoIP mode and directs the call to the gateway exchange 14. From there, the call is further directed to the telephone network 15.

In a fourth example, the user wishes to close the service. This is carried out in such a way that the client disconnects the streaming connection for example by closing the application in his browser or by exiting a certain www page.

Figure 2:
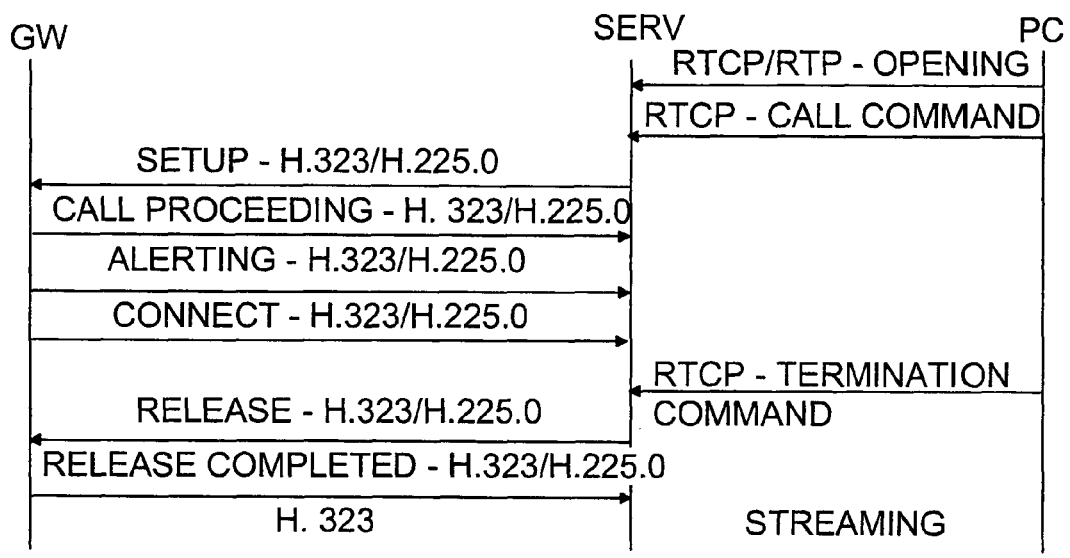
FIG. 2 shows a signalling diagram of a case of the method according to the invention, where the call is initiated and terminated by the VoIP user.

FIG. 2 shows a signaling diagram of the method according to the invention, in which the call is initiated and terminated by the user of the VoIP terminal. The chain of events begins when the user opens a streaming connection from the terminal to the server. This command can be transmitted by means of the RTP (Real-time Transport Protocol) and the RTCP (RTP Control Protocol). Next, the user gives a call command from the terminal to the server, using the RTCP protocol. This command includes information related to the call in question, e.g. the number of the calling subscriber and the number of the called subscriber. After this, the server transmits a 'set-up' command to the gateway, to which command the gateway responds with a 'call proceeding' message. Next, the connection is set up with 'alerting' and 'connect' commands transmitted from the gateway exchange 14 to the server. When the user of the VoIP terminal wishes to terminate the call, a termination command according to the RTCP protocol is transmitted from the terminal to the server. Thus, the server further transmits a 'release' command to the gateway exchange, and the gateway exchange responds to the command with a 'release completed' command.

Figure 3:
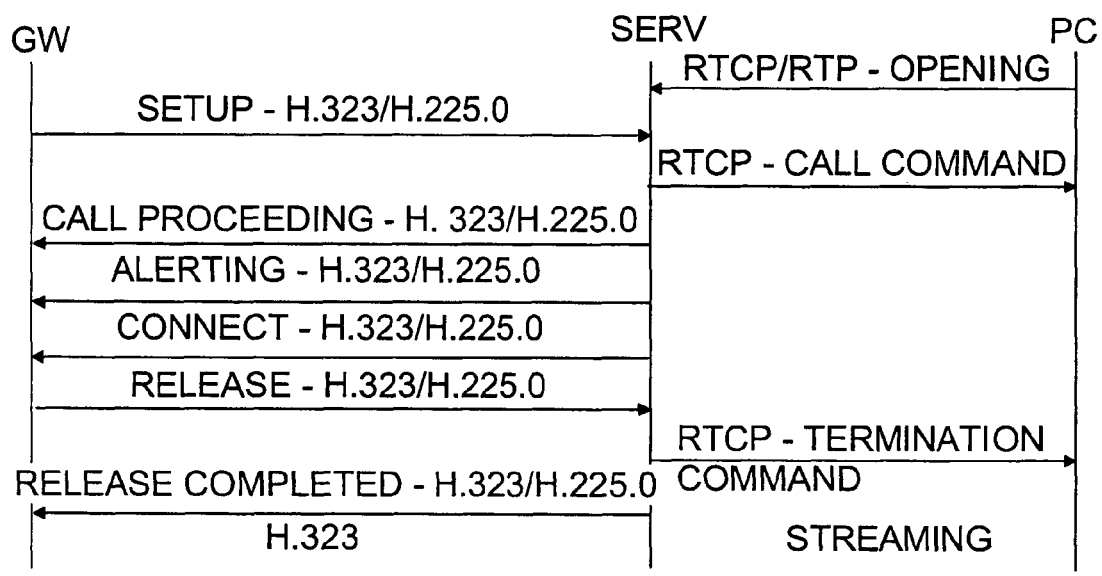
FIG. 3 shows a signalling diagram of a case of the method according to the invention, where the call is initiated and terminated by the user of a public switched telephone network.

FIG. 3 shows a signaling diagram of a situation of the method according to the invention, where the call is initiated and terminated by the user of the telephone network. The chain of events begins when the user opens a streaming connection from the terminal to the server. This command can be transmitted by means of the RTP and RTCP protocols. Next, a 'set-up' command arrives from the gateway exchange to the terminal, after which the server transmits a call command to the user, using an RTCP protocol. Next, the server transmits a 'call proceeding' message to the gateway exchange, after which a connection is set up by means of 'alerting' and 'connect' commands transmitted from the server to the gateway exchange. When the user in the public switched telephone network wishes to terminate the call, a 'release' command is transmitted from the gateway exchange to the server. The server thus further transmits a termination command according to the RTCP protocol to the VoIP terminal. Finally, the gateway exchange transmits a 'release completed' command to the gateway exchange. Deviating from the example, the calling party may also be a user of the DGSM network, for instance.

The messages according to the VoIP protocol shown in FIGS. 2 and 3 are according to the standard H.323/H.225.0, but the invention can also utilize the SIP protocol, the MGCP protocol or corresponding protocols based on signalling.

It will be obvious to a person skilled in the art that with the advance of technology, the basic idea of the invention can be implemented in a plurality of ways. Thus, the invention and embodiments thereof are not confined to the above-described examples but can vary within the scope of the claims.

The invention claimed is:

1. A communication system comprising at least:

a terminal from which a connection can be set up to the Internet;

a register in which subscriber-specific information on call forwarding is stored;

a gateway exchange for routing calls on the basis of the information in said register; and an Internet server which is operatively responsive to a request transmitted from the terminal for:

controlling an installation of software and activation of an application required in the terminal for making and receiving VoIP calls changing call forwarding information in the register in a response to said activation of the application in said terminal in order to route an incoming call from a telephone network for said terminal via the gateway exchange and the Internet server to said terminal; and for converting a data flow transmitted from the gateway exchange to the Internet server during said call into a streaming mode and for transmitting said converted data flow to the terminal during the call.

2. The communication system according to claim 1, wherein the Internet server:

operatively converts a VoIP data flow into a streaming mode, and vice versa.

3. A telecommunications system according to claim 1, characterized in that said means for controlling the installation of the software and the activation of the application comprise means for controlling the installation of the software and the activation of the application as a response to selection of the task performed via a www page.

4. An Internet server for a communication system, the Internet server being operatively responsive to a request transmitted from a terminal for:

controlling an installation of software and activation of an application required in said terminal for making and receiving VoIP calls;

changing call forwarding information in a register in response to said activation of the application in said terminal in order to route a call incoming from a telephone network for said terminal via a gateway exchange and the Internet server to said terminal; and converting a data flow transmitted from the gateway exchange to the internet server during said call into a streaming mode and transmitting said converted data flow to the terminal during the call.

5. The Internet server according to claim 4, wherein the Internet server operatively converts a VoIP data flow into a streaming mode, and vice versa.

6. A method of setting up a connection for VoIP calls, comprising:
bringing into use an Internet server which is responsive to a request from a terminal for controlling an installation of software and an activation of an application required in the terminal for making and receiving the VoIP calls;
setting up a connection between the terminal and the server;
activating in the terminal the application required for making and receiving the VoIP calls, whereby the required software is loaded to the terminal;
changing with said Internet server subscriber-specific call forwarding information in a register in order for a call coming in from a telephone network to the terminal to be routed to the terminal via said Internet server; and
converting in said Internet server a dataflow relating to said incoming call into a steaming mode and transmitting said converted dataflow to said terminal.

7. The method according to claim 6 for setting up the connection for VoIP calls, wherein
the installation of software and the activation are carried out in response to a selection performed by a user via a www page.

8. The method according to claim 6 for setting up the connection for the VoIP calls, comprising:
directing said incoming call in the form of a VoIP data flow from a gateway exchange to said Internet server;
converting in the server the data flow received from the gateway exchange into a streaming mode; and
transmitting the call to the terminal in the streaming mode.

9. The method according to claim 6 for setting up the connection for the VoIP calls, comprising:
making a call by means of a browser program in the terminal;
converting in the Internet server a streaming data flow received from the terminal into a VoIP mode; and
transmitting the call in the VoIP mode to a gateway exchange, from which the call is further transmitted to a telephone network.

* * * * *